J. W. CONDON.
Improvement in Ice-Cream Freezers.
No. 128,856. Patented July 9, 1872.
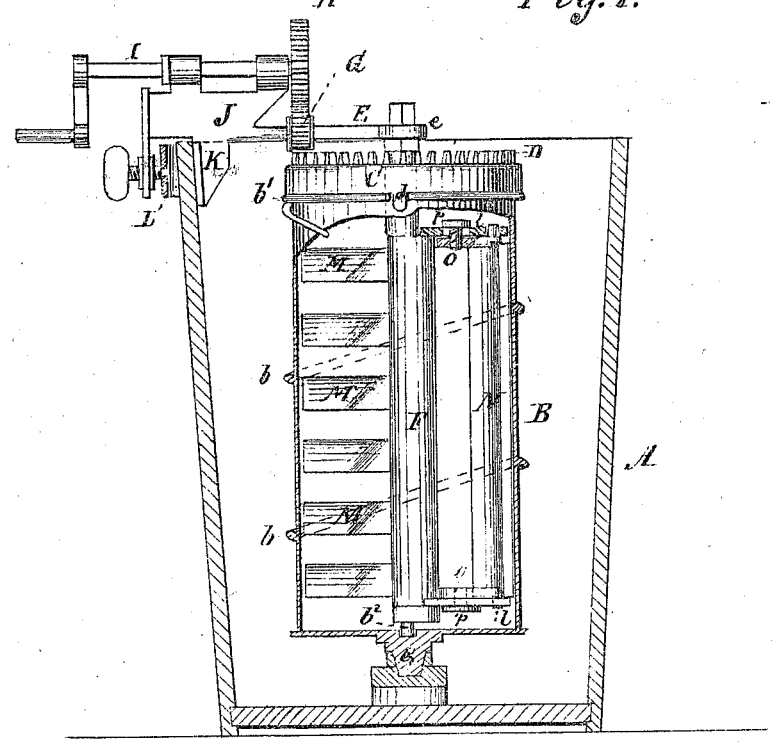
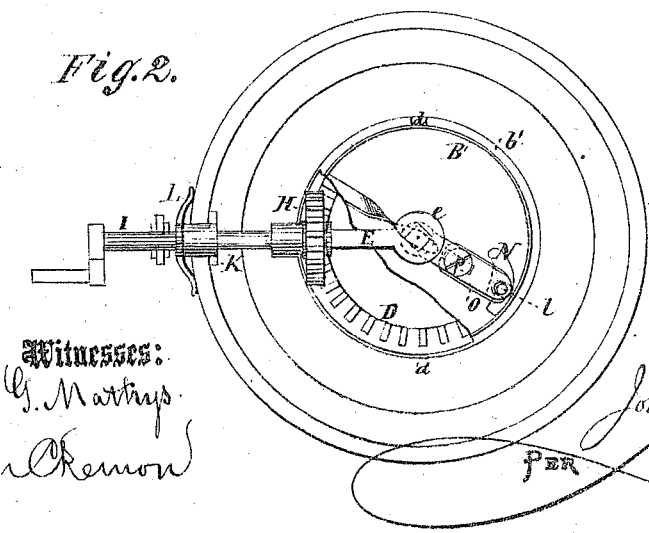
Witnesses:
G. Matthys
John C. Kenon
Inventor:
John W. Condon
per ———
Attorneys.

UNITED STATES PATENT OFFICE.

JOHN W. CONDON, OF LOGANSPORT, INDIANA.

IMPROVEMENT IN ICE-CREAM FREEZERS.

Specification forming part of Letters Patent No. 128,856, dated July 9, 1872.

Specification describing a new and Improved Ice-Cream Freezer, invented by JOHN W. CONDON, of Logansport, in the county of Cass and State of Indiana.

The invention consists in providing the dasher-rod with plate-arms, bent so as to throw the cream upward to assist in creating a uniform frigidity, in combination with a pivoted sweep which serves to keep the sides of the vessel from any adherence of particles; also in the combination of the sweep with adjustable cams to hold them against the side of the vessel; and finally, in a frame which has clamps and a horizontal bar that may be detachably but rigidly fastened to case, so as to receive the operating mechanism and fixedly hold the dasher-shaft or rod.

In the drawing, Figure 1 is a vertical section. Fig. 2 is a top view with parts broken out.

A in the drawing represents the case, and B the cream-vessel. Between these is the space appropriated to ice and salt. At the center of its bottom the vessel B has a journal, b, which plays in the bearing a of case. On the outside of this vessel is placed a spiral flange, b, which carries upward the salt and keeps that part of it which is in contact with the vessel continually in motion. This causes not only a more rapid absorption of the heat from the cream, but renders the absorption to a great extent uniform over the whole surface of the vessel. The cream-vessel has a cover, C, which is provided with a crown-wheel, D, which is rigidly attached thereto, and two downwardly-projecting ears, d d, which lock in corresponding recesses of the rib b'. E is a horizontal bar, whose end e has a square aperture, and serves as a bearing for the upper end of dasher-rod F, while on another part is journaled the pinion G, which connects with spur-wheel H on the crank-shaft I. J is the frame to which these parts are attached, while K is a stationary, and L a movable, clamp-plate thereon, by which it is firmly attached to the casing. F is the dasher-rod, which is provided at intervals with arm-plates M bent over from the bottom toward the upper edges, and calculated to force the cream upward when the vessel rotates. N is the side-sweep, loosely pivoted to arms l l of dasher-rod, and made concave on the inner side, so that the pressure of cream will cause it to bear against the sides and prevent any adherence thereto of the butter globules. O O are pivoted cams, that may be set to hold the sweep more or less to the side of vessel, and are then clamped by set-screws P P.

The operation is as follows: The vessel being filled with cream to the desired extent the dasher is inserted into its place, the cover is fastened upon it, the frame J is clamped to the case, and the salt and ice are arranged between the case and vessel. On turning the horizontal crank-shaft I the vessel B is rotated while the dasher remains stationary. This has the effect, by means of the spiral flange a on the outside, of keeping the freezing mixture in motion, and, of course, thereby causing a more rapid evaporation, since new particles of the heat-absorber are more quickly and often brought into contact with the surface of vessel. Again, by moving it evenly over all parts of the outside of vessel, great uniformity in the time and degree of freezing the cream is obtained. On the inside of the cream-vessel B, the cream being kept continually in circulation, and on an upward movement, the heat is abstracted uniformly from all parts of it.

Having thus described my invention, what I claim as new, and desire to secure by Letters Patent, is—

1. The dasher-rod F, having arm-plates M inclined at top beyond the plane of said rod, in combination with the pivoted sweep N, as and for the purpose described.

2. The combination, with concave sweep N, of the adjustable cams O O, arranged as and for the purpose set forth.

3. In a cream-freezer of the above-described construction, the frame J, provided with bearing-bar E and clamp-plates K L, as described, whereby a detachable but rigid support is furnished to the dasher-rod L, while the vessel revolves about it.

JOHN W. CONDON.

Witnesses:
 CHAS. A. PETTIT,
 THOS. D. D. OURAND.